3,415,852
METHOD OF PREPARING 3-ALKOXY-2-FORMYL-Δ²-STEROIDS AND NEW PRODUCTS RESULTING THEREFROM
John Paul Dusza, Nanuet, N.Y., Joseph Peter Joseph, Cliffside Park, N.J., and Seymour Bernstein, New City, N.Y., assignors to American Cyanamid Company, Stamford, Conn., a corporation of Maine
No Drawing. Filed Aug. 20, 1965. Ser. No. 481,383
5 Claims. (Cl. 260—397.2)

ABSTRACT OF THE DISCLOSURE

A method of preparing 3-alkoxy-2-formyl-Δ²-steroids from the corresponding 2-unsubstituted steroids by reaction with a tri(lower)alkylorthoformate in the presence of a strong acid. The products of the process are physiologically active in warm-blooded animals as central nervous system depressants.

---

This invention relates to steroid compounds. More particularly, it relates to a novel process of preparing 3-alkoxy-2-formyl-Δ²-steroids and new products resulting therefrom.

The process of the present invention may be illustrated as follows:

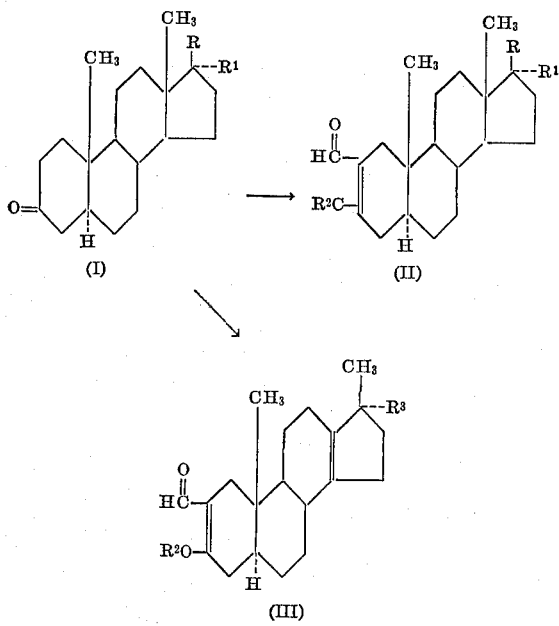

wherein R is selected from the group consisting of alkyl, hydroxyl and lower alkanoyloxy; R¹ is selected from the group consisting of hydrogen and lower alkyl and R² and R³ are lower alkyl.

The products of the present invention are, in general, solids which are insoluble in water and somewhat soluble in the usual organic solvents.

Among the starting materials useful in the process of the present invention can be for example, chloestan-3-one; 17β-hydroxy-17α-methylandrostan-3-one; 17β-hydroxy-17α-propylandrostan-3-one; 17β-hydroxyandrostan-3-one; 17β-formyloxyandrostan-3-one; 17β-acetoxyandrostan-3-one; 17β-propionoxyandrostan-3-one and the like.

The corresponding products resulting from the use of the above starting materials in the present process are 2-formyl-3-methoxycholest-2-ene; 2-formyl-3-methoxy-17,17-dimethyl-18-norandrosta-2,13-diene; 2-formyl-3-methoxy-17α-ethyl-17β-methyl-18-norandrosta-2,13-diene; 2-formyl-3-methoxy-17α-propyl-17β-methyl-18-norandrosta-2,13-diene; 2-formyl-3-methoxy-17β-hydroxyandrost-2-ene; 2-formyl-3-methoxy-17β-formyloxyandrost-2-ene; 2-formyl-3-methoxy-17β-acetoxyandrost-2-ene; 2-formyl-3-methoxy-17β-propionoxyandrost-2-ene, and the like.

The novel process of this invention consists of reacting an appropriate steroid, such as described above, in solution or suspension with tri(lower)alkylorthoformate. Ordinarily, the reaction is carried out by adding an excess of a strong acid such as aqueous perchloric acid (e.g. 72% perchloric acid) or concentrated fluoroboric acid with stirring. Usually, the reaction proceeds satisfactorily at room temperature, but the mixture may be heated gently. In general, the reaction may be carried out at a temperature within the range of 15° o 75° C. for a period of from 10 minutes to 2 hours. Stirring is continued for from about 40 to 60 minutes. The reaction mixture is neutralized with an excess of a saturated sodium bicarbonate or other acid acceptor solution. The aqueous layer is discarded after the product has been extracted with methylene chloride. The methylene chloride is then washed with a saturated saline solution and dried over sodium sulfate. Concentration of the dried extract in a round-bottomed flask on a rotary evaporator ordinarily produces an oily residue from which the product may be precipitated. Purification of the steroid can usually be achieved by direct recrystallization from appropriate solvents such as methanol or acetone-hexane mixture, or by column chromatography on magnesium silicate.

An alternative procedure involves the separation of the initially formed precipitate and its decomposition with pyridine followed by isolation from water. The steroid yielded by this procedure does not need subsequent purification by column chromatography.

The process of this invention represents a significant improvement over prior art in the preparation of 3-alkoxy-2-formyl-Δ²-steroids because of its simplicity and brevity of operation, and high yields. The invention presents a process for the direct conversion of 3-keto-steroids into respective 3-alkoxy-2-formyl-Δ²-steroids. Conventional methods for this conversion, as for example, one reported by D. Burn, et al., Tetrahedron Letters No. 13, pages 773–735 (1964) utilize several separate reactions.

The compounds of this invention are physiologically active in warm-blooded animals as central nervous system depressants. They are therefore useful in the field of hypnotics, transquilizers and the like. The compounds are active in antagonizing the phenyl-p-quinone (PPQ) "writhing" syndronme. The present compounds were tested by a modification of the method described by E. Siegmund et al. Proc. Soc. Exptl. Biol. Med., 95, 729 (1957). Briefly the test is described as follows: Two mice are administered the test compound, orally, 30 minutes prior to the intraperitoneal injection of 1 mg./kg. phenyl-p-quinone. Fifteen minutes later the mice are observed for a period of 3 minutes and the total number of characteristic writhing episodes for both animals is counted and recorded. The mean number of writhes exhibited by 21 pairs of control animals (dosed orally with 2% starch) was 29. For our purposes any compound that reduces the incidence of writhing to 18 or less (2 standard deviations from historical control) is considered a possible active lead. To confirm activity the test is repeated in another pair of mice. If the incidence of writhing is again reduced to 18 or less, the compound is considered active in the PPQ test as a central nervous system depressant, otherwise the compound is rejected.

The compounds of the present invention can be used in the form of compositions preferably administered in unit dosage form such as tablets, pills, capsules, powders, granules, sterile parenteral solutions or suspensions, oral solutions or suspensions and the like. The dosage will depend on the route of administration, age, weight and condition of the warm-blooded animal. A total daily dose of from about 5 mg. to about 250 mg. may be given singly or in divided doses. For preparing solid compositions such as tablets, the principal active ingredient is mixed with conventional tableting ingredients such as corn starch, lactose, succrose, sorbitol, talc, stearic acid, magnesium stearate, dicalcium phosphate, gums, and fractionally similar materials as pharmaceutical diluents or carriers. The tablets or pills of the novel compositions can be laminated or otherwise compounded to provide a dosage form affording the advantage of prolonged or delayed action or predetermined successive action of the enclosed medictaion. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl, an alcohol, cellulose acetate and the like. A particularly advantageous enteric coating comprises a styrene maleic acid copolymer together with known materials contributing to the enteric properties of the coating.

The liquid forms in which the novel composition of the present invention may be incorporated for administration include aqueous solutions, suitably flavored oil, coconut oil, peanut oil and the like, as well as elixirs and similar pharmaceutical vehicles. Suitable dispersing or suspending agents for aqueous suspensions include synthetic and natural gums, such as, tragacanth, acacia, alginate, dextran, sodium carboxymethylcellulose, methylcellulose, polyvinylpyrrolidone, gelatin and the like. Sterile suspensions or solutions are required for parenteral use. Isotonic preparations containing suitable preservatives are also highly desirable for injection use.

The term unit dosage form as used in the specification and claims refers to physically discrete units suitable as unitary dosage for warm-blooded animal subjects, each unit containing a predetermined quantity of active material calculated to produce the desired therapeutic effect in association with the required pharmaceutical diluent, carrier or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use in warm-blooded animals as disclosed in detail in this specification, these being features of the present invention. Examples of suitable oral unit dosage forms in accord with this invention are tablets, capsules, pills, powder packets, granules, wafers, cachets, teaspoonfuls, dropperfuls, ampules, vials and segregated multiples of any of the foregoing.

The present invention will be described in greater detail in the examples which follow which describe the preparation of representative 3-alkoxy-2-formyl-Δ²-steroids.

Example 1.—Preparation of 2-formyl-3-methoxycholest-2-ene

A rapidly stirred solution of 1.0 g. of cholestan-3-one in 10 ml. of trimethylorthoformate is treated with 0.5 ml. of 72% perchloric acid. The amount of acid used corresponds to about 2.1 equivalents. Stirring is continued for about 40 minutes, with the formation of a copious precipitate. The reaction mixture is then neutralized by the addition of a saturated solution of sodium bicarbonate and the precipitate is separated by filtration. On column chromatography of the precipitate, 2-formyl-3-methoxycholest-2-ene, melting point 151°–152° C. is obtained, $[\alpha]_D^{25}+106°$ in $CHCl_3$.

Example 2.—Preparation of 2-formyl-3-methoxycholest-2-ene

A rapidly stirred solution of 2.0 g. of cholestan-3-one in 50 ml. of trimethylorthoformate is treated with 1.0 ml. of 72% perchloric acid. Stirring is continued. The color of the mixture intensified to a dark orange and at about 6 minutes after the addition of the acid the color becomes light yellow and a light yellow precipitate appears. The reaction is stirred for an additional 4 minutes and filtered to yield the crude perchlorate salt which is washed well with orthoester and then repeatedly with anhydrous ether. The solid [2-(3-methoxycholest-2-enyl)]methyl carboxonium perchlorate, has an indefinite melting point 80°–125° C.

About 300 mg. of the perchlorate salt is dissolved in 5 ml. of pyridine and poured into water and filtered to give the desired 2-formyl-3-methoxycholest-2-ene. This is dissolved in a minimum amount of methylene chloride and passed through a pad of sodium magnesium silicate. The compound is eluted by passing approximately 250 ml. of methylene chloride through the pad. The solvent, on evaporation, gives 200 mg. of a colorless steroid, melting point 153°–154° C.

Example 3.—Preparation of 3-ethoxy-2-formylcholest-2-ene

A procedure, substantially as in Example 1, is followed using triethylorthoformate in place of trimethylorthoformate. Compound 3-ethoxy-2-formylcholest-2-ene, melting point 123°–125° C. is recovered, $[\alpha]_D^{25}+97°$ in $CHCl_3$.

Example 4.—Preparation of 2-formyl-3-methoxy-17,17-dimethyl-18-norandrosta-2,13-diene Following a procedure substantially as in Example 1 and using 17β-hydroxy-17α-methylandrostan-3-one as the starting steroid in solution with trimethylorthoformate the compound 2-formyl-3-methoxy-17,17-dimethyl-18-norandrosta-2,13-diene is obtained, melting point 141°–142° C., $[\alpha]_D^{25}+28°$ in $CHCl_3$.

We claim:
1. A method of preparing steroids selected from the group consisting of those of the formulas:

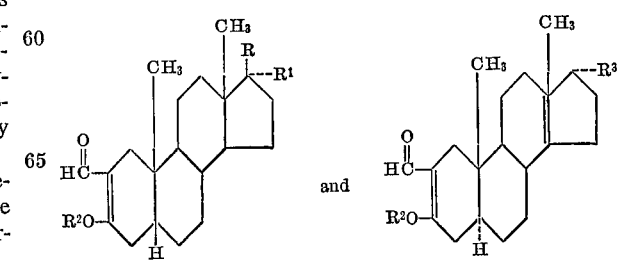

wherein R is selected from the group consisting of alkyl of 1 to 8 carbon atoms, hydroxyl and lower alkanoyloxy; $R^1$ is selected from the group consisting of hydrogen and lower alkyl and $R^2$ and $R^3$ are lower alkyl which comprises contacting a steroid of the formula:

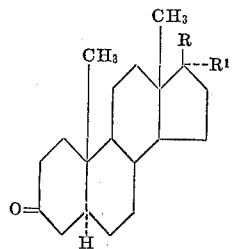

wherein R and $R^1$ are as defined above, with a tri-(lower) alkylorthoformate and a strong acid and recovering said compound therefrom.

2. A method of preparing 2-formyl-3-methoxycholest-2-ene which comprises contacting cholestan-3-one with trimethylorthoformate in the presence of perchloric acid and recovering said compound therefrom.

3. A method of preparing 3-ethoxy-2-formyl-cholest-2-ene which comprises contacting cholestan-3-one with triethylorthoformate in the presence of perchloric acid and recovering said compound therefrom.

4. A method of preparing 2-formyl-3-methoxy-17,17-dimethyl-18-norandrosta-2,13-diene which comprises contacting 17β-hydroxy-17α-methylandrosta-3-one with trimethylorthoformate in the presence of perchloric acid and recovering said compound therefrom.

5. The compound 2-formyl-3-methoxy-17,17-dimethyl-18-norandrosta-2,13-diene.

References Cited

UNITED STATES PATENTS 3,160,643  12/1964  Burn et al. _____ 260—397.4
3,305,545  2/1967  Ruggieri et al. ____ 260—211.5

OTHER REFERENCES

Youssefyeh, R. Journ. Amer. Chem. Soc., 85, 23, Dec. '63, pp. 3901–02.

LEWIS GOTTS, *Primary Examiner.*

E. G. LOVE, *Assistant Examiner.*

U.S. Cl. X.R.

260—397.45, 397.4; 167—65